United States Patent
Tanaka et al.

(10) Patent No.: US 8,843,713 B2
(45) Date of Patent: Sep. 23, 2014

(54) STORAGE SYSTEM HAVING DATA COPY FUNTION AND METHOD THEREOF

(75) Inventors: Hideyuki Tanaka, Kawasaki (JP);
Hideaki Takahashi, Yokohama (JP);
Mana Tanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 12/749,581

(22) Filed: Mar. 30, 2010

(65) Prior Publication Data
US 2010/0250884 A1 Sep. 30, 2010

(30) Foreign Application Priority Data

Mar. 30, 2009 (JP) .................. 2009-083192

(51) Int. Cl.
*G06F 12/00* (2006.01)
*G06F 11/20* (2006.01)
(52) U.S. Cl.
CPC ........ *G06F 11/2069* (2013.01); *G06F 11/2071* (2013.01)
USPC ....................................................... 711/162
(58) Field of Classification Search
None
See application file for complete search history.

(56) References Cited

U.S. PATENT DOCUMENTS

| | | |
|---|---|---|
| 2004/0268069 A1 | 12/2004 | Satoyama et al. |
| 2005/0033936 A1 | 2/2005 | Nakano et al. |
| 2007/0180208 A1 | 8/2007 | Yamasaki |
| 2008/0005288 A1 | 1/2008 | Kodama et al. |
| 2009/0055608 A1 | 2/2009 | Yamasaki |
| 2009/0132779 A1* | 5/2009 | Amaki et al. ................. 711/167 |
| 2009/0157991 A1* | 6/2009 | Rajan et al. .................... 711/162 |
| 2010/0088279 A1* | 4/2010 | Zhang et al. ................. 707/640 |

FOREIGN PATENT DOCUMENTS

| | | |
|---|---|---|
| JP | 2005-18185 | 1/2005 |
| JP | 2005-275526 | 10/2005 |
| JP | 2007-200195 | 8/2007 |
| JP | 2008-9707 | 1/2008 |

OTHER PUBLICATIONS

Japanese Office Action issued Oct. 23, 2012 in corresponding Japanese Patent Application No. 2009-083192.

* cited by examiner

*Primary Examiner* — Matthew Bradley
*Assistant Examiner* — Daniel Tsui
(74) *Attorney, Agent, or Firm* — Staas & Halsey LLP

(57) ABSTRACT

A storage system includes a primary-side storage device and a secondary-side storage device. The primary-side storage device includes a first storage unit that functions as: a primary-side reserving unit to reserve a primary-side storage area in the first storage unit; a request unit to request the secondary-side storage device to reserve a secondary-side storage area; a checking unit to receive identifying information of the reserved secondary-side storage area; a management storage unit to store the identifying information of the secondary-side storage area in the way of being associated with the primary-side storage area; and a transfer unit to transfer data stored in the primary-side storage area to the secondary-side storage area. The secondary-side storage device includes a second storage unit that functions as: a request accepting unit to accept a request for reserving the secondary-side storage area from the primary-side storage device; a secondary-side reserving unit to reserve the secondary-side storage area in the second storage unit in response to the request; and a report unit to report the identifying information of the reserved secondary-side storage area to the primary-side storage device.

4 Claims, 17 Drawing Sheets

FIG. 6

| COPY SOURCE AREA IDENTIFIER | COPY DESTINATION DEVICE IDENTIFIER | COPY DESTINATION AREA IDENTIFIER | ALLOCATION QUANTITY (GB) |
|---|---|---|---|
| 0110 | B | 0310 | 100 |
| 0111 | B | 0311 | 150 |
| ⋮ | ⋮ | ⋮ | ⋮ |

FIG. 10

HOUSING INFORMATION HELD BY STORAGE DEVICE A

| DEVICE IDENTIFIER | FREE CAPACITY | DEVICE TYPE | SITE INFORMATION |
|---|---|---|---|
| A | 500GB | M | G |
| B | 1,200GB | S | G |
| D | 1,100GB | S | B |
| E | 700GB | S | B |
| F | 1,500GB | S | B |

FIG. 11

HOUSING INFORMATION HELD BY STORAGE DEVICE C

| DEVICE IDENTIFIER | FREE CAPACITY | DEVICE TYPE | SITE INFORMATION |
|---|---|---|---|
| C | 800GB | M | G |
| D | 1,100GB | S | B |
| E | 700GB | S | B |
| F | 1,500GB | S | B |

FIG. 12

HOUSING INFORMATION HELD BY STORAGE DEVICE D

| DEVICE IDENTIFIER | FREE CAPACITY | DEVICE TYPE | SITE INFORMATION |
|---|---|---|---|
| A | 500GB | M | G |
| B | 1,200GB | S | G |
| C | 800GB | M | G |
| D | 1,100GB | S | B |
| E | 700GB | S | B |
| F | 1,500GB | S | B |

FIG. 13

ALLOCATION INFORMATION HELD BY STORAGE DEVICE A

| COPY SOURCE | | COPY DESTINATION | | ALLOCATION CAPACITY |
|---|---|---|---|---|
| DEVICE IDENTIFIER | AREA IDENTIFIER | DEVICE IDENTIFIER | AREA IDENTIFIER | |
| A | 0110 | D | 0210 | 100GB |
| A | 0111 | D | 0211 | 150GB |
| A | 0112 | D | 0212 | 100GB |
| A | 0113 | E | 0110 | 150GB |
| A | 0114 | E | 0111 | 100GB |

FIG. 14

ALLOCATION INFORMATION HELD BY STORAGE DEVICE C

| COPY SOURCE | | COPY DESTINATION | | ALLOCATION CAPACITY |
|---|---|---|---|---|
| DEVICE IDENTIFIER | AREA IDENTIFIER | DEVICE IDENTIFIER | AREA IDENTIFIER | |
| C | 0110 | D | 0110 | 100GB |
| C | 0111 | D | 0111 | 150GB |
| C | 0112 | F | 0210 | 100GB |
| C | 0113 | F | 0211 | 150GB |
| C | 0114 | F | 0212 | 100GB |

FIG. 15

ALLOCATION INFORMATION HELD BY STORAGE DEVICE D

| COPY SOURCE | | COPY DESTINATION | | ALLOCATION CAPACITY |
|---|---|---|---|---|
| DEVICE IDENTIFIER | AREA IDENTIFIER | DEVICE IDENTIFIER | AREA IDENTIFIER | |
| C | 0110 | D | 0110 | 100GB |
| C | 0111 | D | 0111 | 150GB |
| A | 0110 | D | 0210 | 100GB |
| A | 0111 | D | 0211 | 150GB |
| A | 0112 | D | 0212 | 100GB |

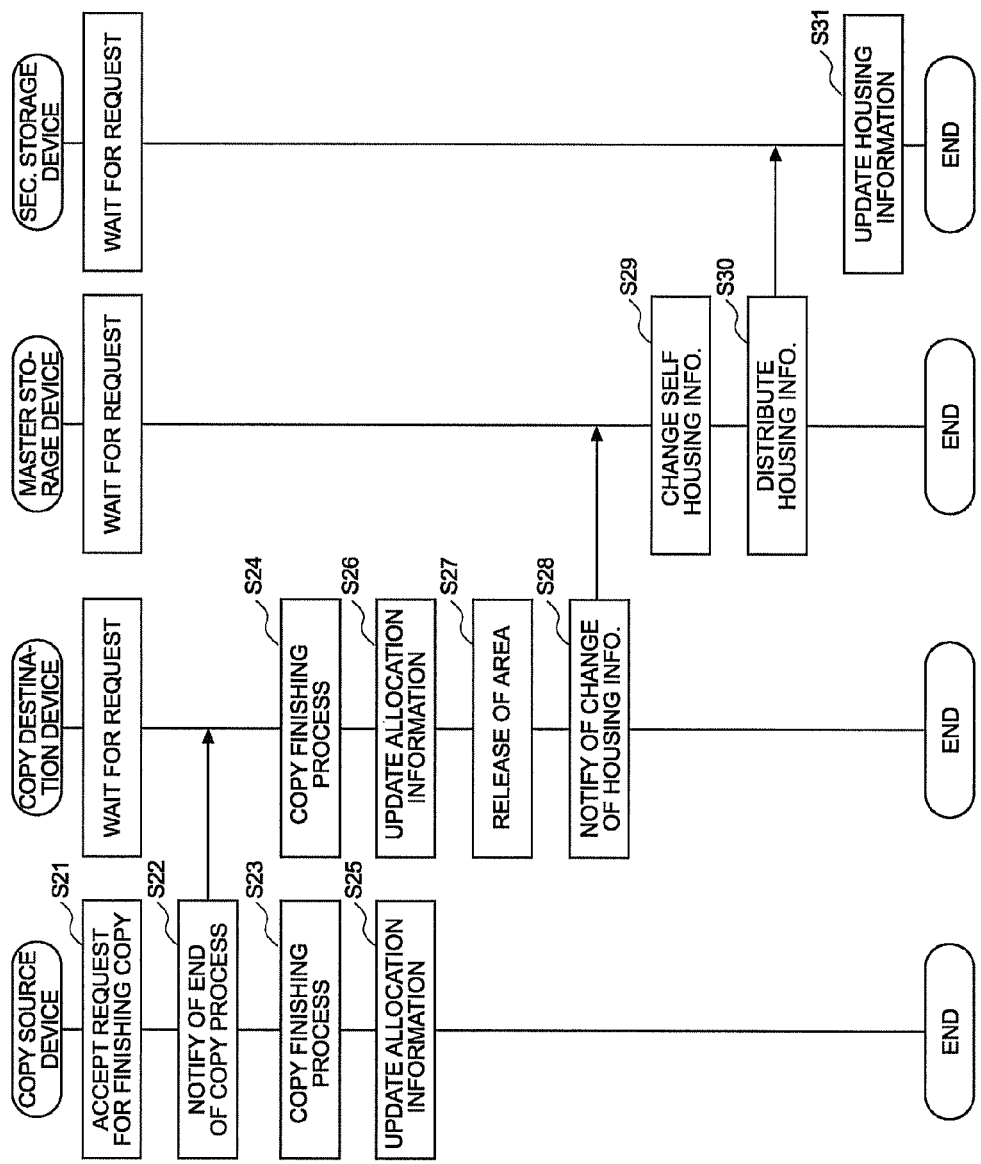

STORAGE SYSTEM HAVING DATA COPY FUNTION AND METHOD THEREOF

CROSS-REFERENCE TO RELATED APPLICATIONS

This application is based upon and claims the benefit of priority of the prior Japanese Patent Application No. 2009-83192, filed on Mar. 30, 2009, the entire contents of which are incorporated herein by reference.

FIELD

The present invention relates to a storage system.

Nowadays, there is a case in which a computer user installs a second computer at a remote place distanced from a point where a first computer system operates. In this case, the first computer is utilized mainly for the user to fulfill business. On the other hand, though an application and a purpose for installing the second computer system are diversified, for example, there is a case of installing a computer system for backing up the data. In this case, a point where the first computer system is installed is called a business site. On the other side, a point where the data backup computer system is installed is called a backup site.

The backup site may be considered to be a simple data archive. Accordingly, the system installed at the backup site is desired to have a configuration that is as simple as possible. Generally, the computer system includes a server and a storage device. Further, a computer for maintenance, which performs a maintenance work, is installed as the case may be.

For instance, at a stage of a system design, the storage device at the backup site has hitherto been configured in the way of being associated with a volume configuration of the storage device at the business site in many cases. Then, the storage device at the business site executes inter-remote-place copy to the storage device at the backup site. If the configuration or a capacity of the storage device is not changed, the same server as the server at the business site may not be installed at the backup site.

However, a data quantity, which should be processed by the computer system, increases with an expansion of the business of the user. Accordingly, after starting the operation of the computer system, the configuration is changed or the capacity is augmented from the configuration or the capacity of the storage device at the initial design stage in many cases. For example, such a demand might arise that the volume be additionally allocated to the initial storage device.

When the change of the configuration or the expansion of the capacity of the storage device such as the additional allocation of the volume is carried out at the business site, it follows that the same operation is conducted with respect to the storage device at the backup site. Therefore, the backup site is equipped with the computer for maintenance for executing at least the maintenance work in preparation for the change of the configuration or the expansion of the capacity of the storage device. Then, the volume management operation for the storage device such as the addition of the volume is conducted also in the storage device at the backup site in the same way as the operation performed for the storage device at the business site.

[Patent document 1] Japanese Patent Laid-Open Publication No. 2005-18185

SUMMARY

As described above, the prior art did not sufficiently simplify the operation of the system management in the system including the business site and the backup site. It is an object of the embodiment of the disclosure to provide a technology of simplifying the management operation of the system including a copy source storage device and a copy destination storage device or simplifying a configuration for the management operation.

An embodiment of the disclosure is exemplified by a storage system comprising a primary-side storage device and a secondary-side storage device. The primary-side storage device includes a first storage unit capable of reservation of a storage area, and a first control unit to control the first storage unit. And, the first control unit functions as: a primary-side reserving unit to reserve a primary-side storage area in the first storage unit; a request unit to request said secondary-side storage device to reserve a secondary-side storage area serving as copy destination area of the primary-side storage area; a checking unit to receive identifying information of the secondary-side storage area reserved by said secondary-side storage device; a management storage unit to store the identifying information of the secondary-side storage area in the way of being associated with the primary-side storage area; and a transfer unit to transfer data stored in the primary-side storage area to the secondary-side storage area.

Moreover, the secondary-side storage device includes a second storage unit capable of reservation of a storage area and a second control unit to control said second storage unit. And, the second control unit functions as: a request accepting unit to accept a request for reserving the secondary-side storage area serving as the copy destination area of the primary-side storage area from said primary-side storage device; a secondary-side reserving unit to reserve the secondary-side storage area in said second storage unit in response to the request; and a report unit to report the identifying information of the reserved secondary-side storage area to said primary-side storage device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 6 is a diagram illustrating allocation information;

FIG. 10 is a diagram of an example of housing information of a storage device A;

FIG. 11 is a diagram of an example of the housing information of a storage device C;

FIG. 12 is a diagram of an example of the housing information of a storage device D;

FIG. 13 is a diagram of an example of allocation information of the storage device A;

FIG. 14 is a diagram of an example of the allocation information of the storage device C;

FIG. 15 is a diagram of an example of the allocation information of the storage device D;

FIG. 18 is a diagram illustrating a processing flow when finishing the copy process.

DESCRIPTION OF EMBODIMENTS

An information system according to some embodiments will hereinafter be described with reference to the drawings. A configuration in each of the following embodiments is an exemplification, and the present information system is not limited to the configuration in each embodiment.

First Embodiment

Figure 1:
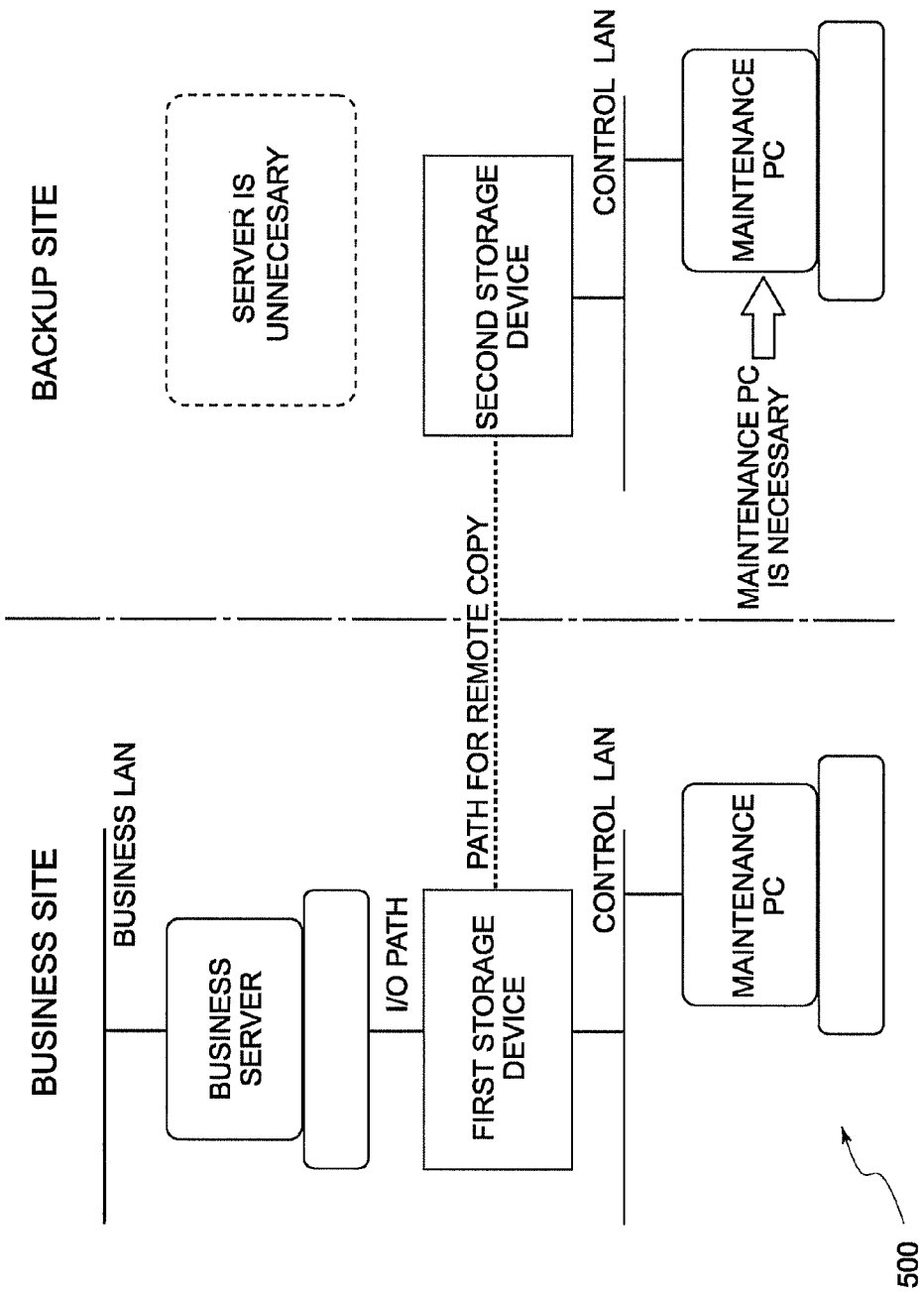
FIG. 1 is a diagram illustrating an information system where a configuration of a backup site is partially simplified.

FIG. 1 illustrates an exemplification of an information system 500 in which a configuration of a backup site is partially simplified by way of a comparative example of the present information system. The information system 500 includes a computer system of a business site and a computer system of the backup site. The computer system of the business site includes a business server, a first storage device and a personal computer for maintenance ("maintenance PC" in the figure). The personal computer will hereinafter be abbreviated to PC. The business server and the storage device are connected to each other via a path (channel) specified by an input/output (I/O) interface. Interfaces known as this type of I/o interface are, e.g., Fibre Channel (FC), Internet Small Computer System Interface (iSCSI), AT Attachment (ATA), etc. Further, a connection between the first storage device and the PC for maintenance is established by a network such as a control Local Area Network (LAN).

The business server executes information processes accompanying a variety of business fulfilled by a user. For example, an online transaction process and the like are executed. The first storage device is stored with various items of processing target data of the business server. The maintenance PC executes a variety of maintenance works such as allocating a new volume in the first storage device.

On the other hand, the computer system of the backup site includes a second storage device and a maintenance PC. The configuration in FIG. 1 is not provided with the server of the backup site. The second storage device is connected to the first storage device via a path for remote copy. The FC-based path can exemplify the path for Remote copy. Further, for others, the path for remote copy can be exemplified by a general public line such as Wide Area Network (WAN), a virtual private line such as Virtual Private Network (VPN), or a path which connects an individually built-up private line to a fibre channel.

In the information system 500, a volume similar to the volume defined in the first storage device is also defined in the second storage device. For example, at the time of an initial configuration of the information system 500, a volume for backing up the volume of the first storage device is defined in the second storage device. In this case, a capacity of the volume of the second storage device is the same as the volume defined in the first storage device or larger than the volume defined in the first storage device. Accordingly, remote copy is implemented between the first storage device and the second storage device, whereby the backup of the data retained by the first storage device is created in the second storage device. This type of remote copy function is loaded into, e.g., a control unit of each of the first storage device and the second storage device.

Moreover, if the maintenance PC of the business site adds a new volume to the first storage device, the maintenance PC of the backup site adds the volume also to the second storage device. After the volume has been thus added, the setting is such that the control unit of each of the first storage device and the second storage device copies added or updated data within the added volume to the second storage device from the first storage device. With this scheme, remote copy is executed with respect to the new volume.

The configuration of the information system 500, however, involves using the maintenance PC at the backup site. Moreover, it follows that an operation equal to the operation carried out at the business site is performed also at the backup site via the maintenance PC of the backup site. Hence, there is a case in which an operation mistake might be caused.

Figure 2:
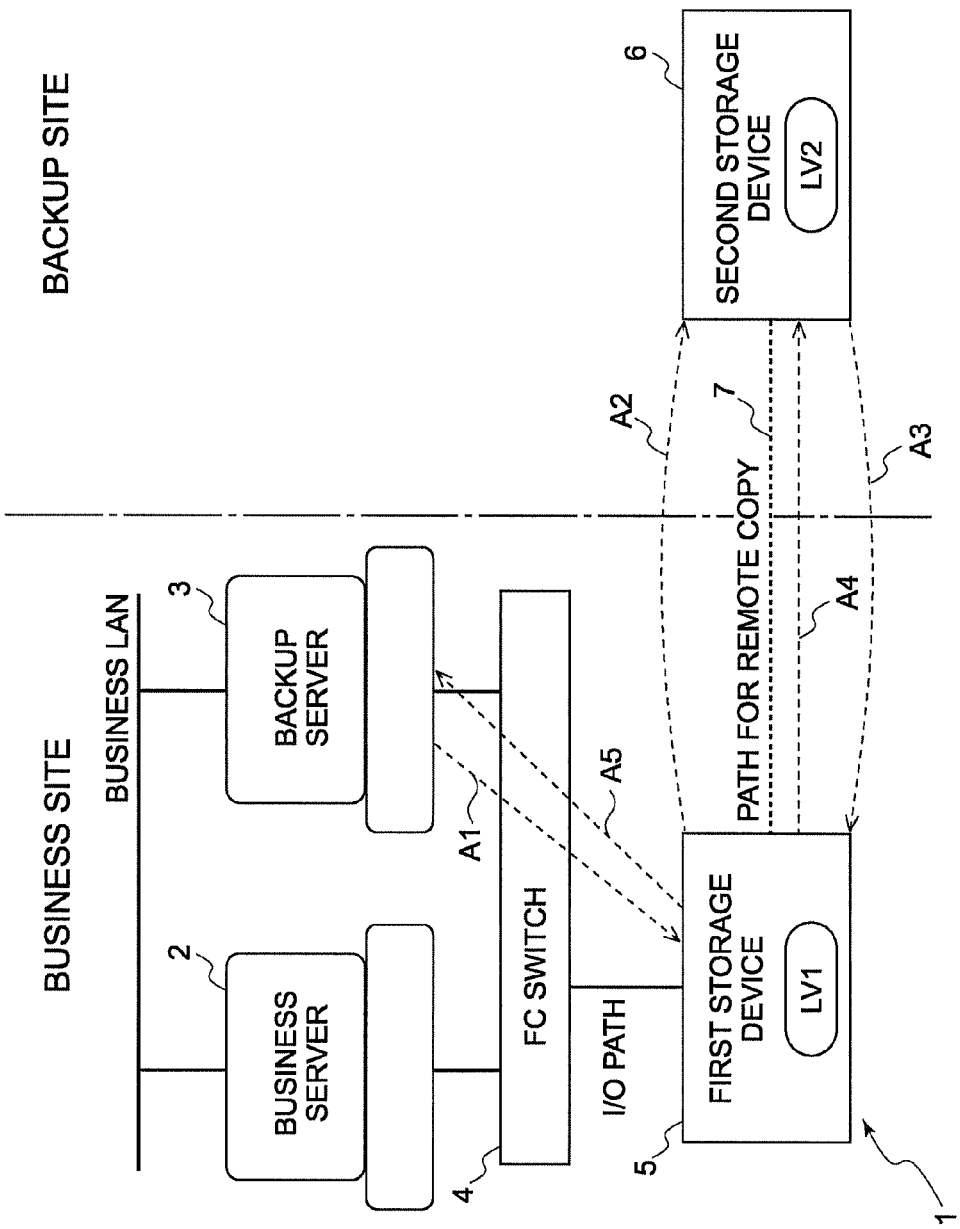
FIG. 2 is a diagram illustrating an outline of a configuration of the information system according to a first embodiment.

FIG. 2 illustrates an outline of a configuration of an information system 1 according to the first embodiment. The information system 1 includes a business server 2, a backup server 3, an FC switch 4 and a first storage device 5 (corresponding to a primary-side storage device) at the business site. Further, the information system 1 includes a second storage device 6 (corresponding to a secondary-side storage device) at the backup site. The first storage device 5 is connected to the second storage device 6 via a path 7 for remote copy.

The business server 2 is a computer that executes a variety of processes at the business site of the user. The backup server 3 is a server that backs up the various items of operation data and manages the copy, etc. in the information system 1. The backup server 3 executes operations such as accepting, e.g., designation of a backup target volume from the user and instructing the storage device to register a backup process of the designated volume and to execute the backup process. The process of backing up and copying the data is called a copy process.

More specifically, the copy process connotes a process of storing the data stored in the first storage device 5 also in the second storage device 6. The copy process in the first embodiment involves designating a logical volume that should be set as a copy process target volume in the first storage device 5. The logical volume is defined as one aggregation of storage areas in the variety of storage devices. Then, if the data is added or updated within the logical volume designated as the copy process target volume, the added or updated data is added or updated also in the second storage device 6. Namely, when once set as the copy process target volume, it follows that the addition or the update of the data of the copy process target logical volume in the first storage device reflects in the logical volume of the second storage device 6. This process is also called a synchronizing process.

The FC switch 4 is an interface for establishing the connections between a plurality of signal paths (signal channels) such as the FCs. In the configuration of FIG. 2, the business server 2 and the backup server 3 access, via the FC switch 4, the first storage device 5 through the signal path such as the FC. Further, the path 7 for remote copy is, e.g., the signal path (signal channel) such as the FC. The path 7 for remote copy may also, however, be attained by connecting the signal paths such as the FCs to each other via the WAN and other type of remote communication path halfway.

The configuration described above is the same as in the case of FIG. 1. In the case of the information system 1 in FIG.

2, however, as compared with the information system 500 in FIG. 1, the maintenance PC is not provided at the backup site.

To be specific, in the information system 1, the server does not exist at the backup site, and, in addition, the maintenance PC does not exist. In the information system 1, when starting up the backup process to the second storage device 6 from the first storage device 5, the logical volume, to which the data is copied, is created.

Herein, both of the first storage device 5 and the second storage device 6 have a plurality of external storage devices, e.g., hard disk drives. In the external storage device such as the hard disk drive, each storage area is segmented into storage areas each having a predetermined fixed length. The storage area having the fixed length such as this is called a block or an extent.

The first storage device 5 and the second storage device 6 configure one logical external storage device by combining the plurality of external storage devices. This type of logical external storage device is provided as, e.g., Redundant Arrays of Inexpensive Disks (RAID). This logical external storage device includes one or more logical volumes. The logical volume is the unit on which the first storage device 5 and the second storage device 6 provide the storage areas to the high-order computers such as the business server 2 and the backup server 3. This type of logical volume is recognized as the logical storage device from the high-order computer such as the backup server 3. The high-order computer provides the user with the logical volume named a drive or a partition. The block or the extent contained in the logical volume might be logically disposed in dispersion into the plurality of external storage devices.

The first storage device 5 and the second storage device 6 each conduct management as to which block or extent of the actual physical external storage device is contained by each logical volume. Specifically, the first storage device 5 and the second storage device 6 have mapping information for defining a relation between the blocks or the extents within the respective logical volumes and the blocks or the extents of the actual physical external storage devices.

Accordingly, for instance, the backup server 3 instructs the first storage device 5 to start up the copy process on the unit of the logical volume (an arrow A1). At this time, the backup server 3 designates the logical volume of the first storage device 5 becoming the copy process target device and also designates the second storage device 6 as the copy destination device. This designation may also be given by the user on the terminal connected to, e.g., the backup server 3. Now, an assumption is that LV1 is the copy target logical volume.

Then, the first storage device 5 acquires capacity information containing a storage capacity of the designated logical volume LV1, and transmits the capacity information to the second storage device 6 (an arrow A2). This transmission may be performed on the same path as the path 7 for remote copy. This transmission serves also as an area reserving instruction given to the second storage device 6 from the first storage device 5. Accordingly, this transmission may contain information corresponding to the area reserving instruction.

Then, the second storage device 6 at the backup site allocates a new logical volume within the second storage device 6 by use of the capacity information received from the first storage device 5. This logical volume becomes a destination volume to which the logical volume LV1 of the first storage device 5 is copied. This copy destination volume is called, e.g., a logical volume LV2. The copy destination logical volume LV2 is given a piece of identifying information recognized by the second storage device 6. The identifying information for identifying the logical volume is called a logical volume number. It is now assumed that LVN2 is the logical volume number of the newly reserved logical volume LV2.

When succeeding in the allocation of the logical volume LV2, the second storage device 6 transmits the logical volume number LVN2 of the logical volume LV2 to the first storage device 5 (an arrow A3). This transmission may be performed on the same path as the path 7 for remote copy.

When acquiring the logical volume number LVN2 of the logical volume LV2 in the second storage device 6, the first storage device gets stored with the copy destination logical volume number LVN2 in the way of being associated with the copy source logical volume number LVN1. Further, the first storage device designates the logical volume number LVN2 of the copy destination logical volume number LVN2 of the second storage device 6, and starts up the copy process in a way that targets on the copy source logical volume LV1.

With this copy process, the first storage device 5, to begin with, transfers the existing data retained in the copy source logical volume LV1 to the second storage device 6 (an arrow A4). At this time, along with the data transfer, the copy destination logical volume number LVN2 is designated. The second storage device 6 stores the transferred data in the logical volume LV2 specified by the logical volume number LVN2. Hereafter, each time the data is updated or added in the logical volume LV1 of the first storage device 5, it follows that the updated or added data is stored in the logical volume LV2 specified by the logical volume number LVN2 in the second storage device 6.

Then, the first storage device 5 reports, as a result of the starting up the copy process, the copy destination logical volume number LVN2 to the backup server 3 which has given the copy process startup instruction (an arrow A5).

Herein, the example of starting up the copy process according to the instruction given from the backup server 3 has been described, however, the copy process between the first storage device 5 and the second storage device 6 is not limited to those procedures. For example, the copy process may also be start up based on the instruction given from the business server 2.

It may be sufficient that the processes indicated by the arrows A2 through A5 in FIG. 2 are realized in such a way that the control device mounted in the storage device 5 or the storage device 6 executes a control program.

Figure 3:
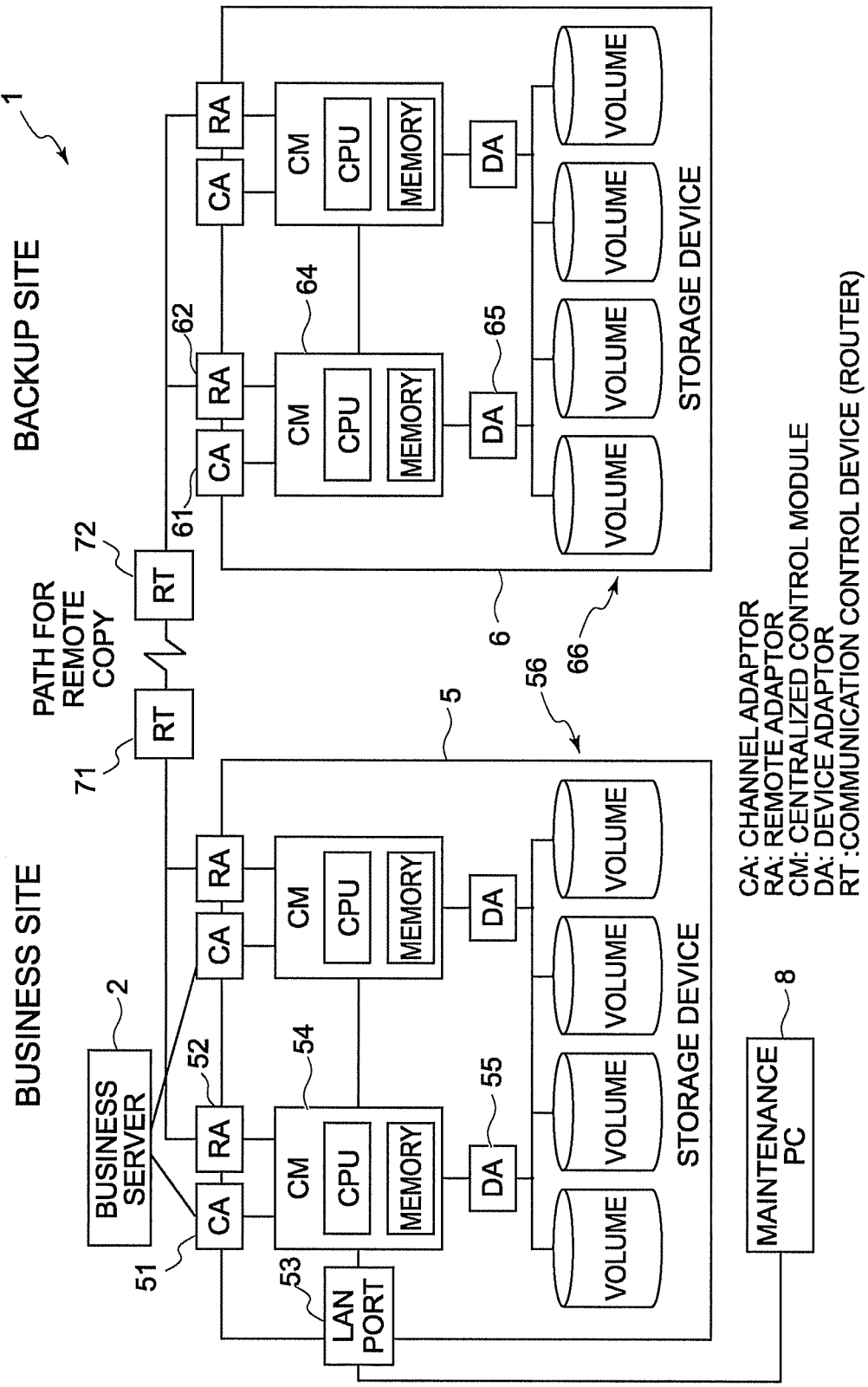
FIG. 3 is a diagram illustrating the specific configuration of the information system.

FIG. 3 illustrates the configuration of the information system 1 including the first storage device 5 and the second storage device 6, which execute the copy process. FIG. 3 illustrates the first storage device 5, the second storage device 6, the business server 2 and maintenance PC 8 at the business site. Accordingly, in FIG. 3, the backup server 3 of FIG. 2 is omitted.

As illustrated in FIG. 3, each of the first storage device 5 and the second storage device 6 includes the same configuration. This being the case, the following discussion will exemplify the configuration of the first storage device 5. The first storage device 5 has a channel adaptor 51, a remote adaptor 52, a LAN port 53, a centralized control module 54 (corresponding to a first control unit), a device adaptor 55 and an external storage device 56 (corresponding to a storage unit of a primary-side storage device). Further, the first storage device 5 is connected to the second storage device 6 via communication control devices 71, 72. In the example of FIG. 3, the channel adaptor 51, the remote adaptor 52, the centralized control module 54 and the device adaptor 55 are provided in redundancy in two systems. The information system 1 according to the present embodiment may also adopt a configuration of providing one system ranging from the channel adaptor 51 up to the device adaptor 55.

The channel adaptor 51 connects a high-order computer such as the business server 2 to the first storage device 5. The business server 2 accesses the first storage device 5 via the channel adaptor 51, and performs communications with a control unit such as a Central Processing Unit (CPU) of, e.g., the centralized control module 54. The channel adaptor 51 provides an interface like FC, iSCSI or ATA to the computer such as the business server 2.

The remote adaptor 52 connects the first storage device 5 to the communication control device 71. The remote adaptor 52 performs the communications with the communication control device 71 via the interface such as FC, iSCSI or ATA. Herein, the communication control device 71 is, e.g., a router. Accordingly, the communication control devices 71, 72 execute the copy process between remote places. Note that if the first storage device 5 and the second storage device 6 are installed within a range of a distance at which the devices 5, 6 can be connected via the FC such as within the same local area, the communication control devices 71, 72 may be omitted. In this case, it follows that the first storage device 5 is connected to the second storage device 6 via the interface such as the FC.

The centralized control module 54 is also called a control unit. The centralized control module 54 includes the CPU and a memory. The CPU executes a computer program stored in the memory, and thus controls the first storage device 5. The memory develops and retains the computer program in an executable format. Further, the memory retains various items of management information of the external storage device 56. Moreover, the memory functions as a temporary storage area, i.e., a so-called buffer, of the external storage device 56. With this configuration, the centralized control module 54 provides a communication function with the business server 2, a communication function with the second storage device 6 and a data input/output function to or from the external storage device 56. Furthermore, the centralized control module 54 provides a copy process function etc. of the data stored in the external storage device 56 to the second storage device.

The device adaptor 55 provides an interface with the centralized control module 54 and with the external storage device 56. The device adaptor 55 accepts a command for controlling, e.g., the hard disk drive from the centralized control module 54, thereby operating the respective units of the hard disk drive.

The external storage device 56 is a storage device including, e.g., a hard disk etc. The external storage device 56 physically includes a plurality of hard disks in many cases. For example, the external storage device 56 may be the RAID. The external storage device 56 may also, however, be a single hard disk. The external storage device 56 may also be a plurality of simple hard disks with no redundancy. Moreover, the external storage device 56 may also be a device such as a flash memory other than the hard disk. As already stated, the centralized control module 54 functioning as the control device creates the logical volume from the external storage device 56 exemplified as the devices described above and provides the logical volume to the business server 2.

The LAN port 53 is an interface via which the centralized control module 54 connects with the LAN. The maintenance PC 8 performs the communications with the centralized control module 54 via the LAN port 53.

The second storage device 6 includes a channel adaptor 61, a remote adaptor 62, a centralized control module 64 (corresponding to a second control unit), a device adaptor 65 and an external storage device 66 (corresponding to a storage unit of the secondary-side storage device). This configuration is the same as the configuration of the first storage device, and hence the detailed description thereof is omitted. For example, the centralized control module 64 functioning as the control device creates the logical volume from the plurality of hard disks.

Figure 4:
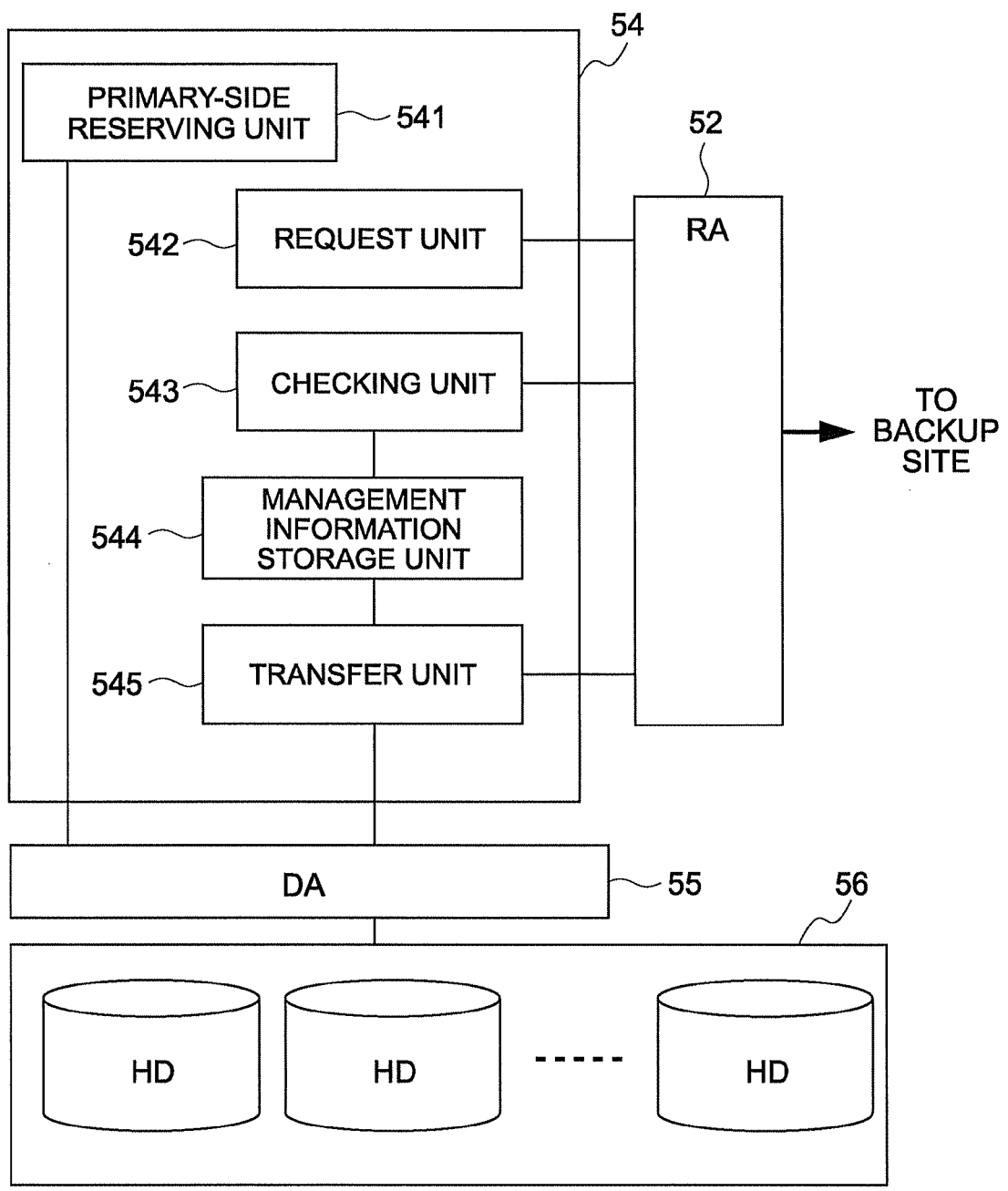
FIG. 4 is a function block diagram of a first storage device.

FIG. 4 is a functional block diagram of the first storage device 5. The CPU of the centralized control module 54 executes the control program developed on the memory, and realizes the respective functions illustrated in FIG. 4. As illustrated in FIG. 4, the first storage device 5 includes a primary-side reserving unit 541, a request unit 542, a checking unit 543, a management information storage unit 544 and a transfer unit 545.

The primary-side reserving unit 541 reserves the logical volume as a primary-side storage area in the storage area including one or plural external storage devices 56. As already explained, the external storage device 56 is, e.g., the hard disk etc. The primary-side reserving unit 541 reserves the logical volume by combining storage unit areas called the extents or blocks within the external storage device 56. The logical volume recognized as the partition or the drive by the user via a business computer such as the business server 2 and the backup server 3.

The request unit 542 requests the second storage device 6 at the backup site to reserve the logical volume serving as the secondary-side storage area becoming a copy destination of the primary-side storage area together with the storage capacity of the primary-side storage area. Namely, the request unit 542 accepts the designation of the copy process target logical volume from the user via, e.g., the business server 2, the backup server 3, etc. Then, the request unit 542 instructs the second storage device 6 at the backup site for the storage capacity of the copy process target logical volume, thus making a request for enduring the logical volume.

The checking unit 543 receives the logical volume number as the identifying information of the logical volume reserved by the second storage device 6. The management information storage unit 544 is stored with the logical volume number of the logical volume as the secondary-side storage area in the way of being associated with the logical volume number of the logical volume as the primary-side storage area.

The transfer unit 545 transfers, when the data is added or updated to or in the copy process target logical volume, this data to the second storage device 6. Note that when starting the copy process, the transfer unit 545 transfers the existing data to the second storage device 6 in order to take synchronism of the data between the logical volume of the first storage device 5 and the logical volume of the second storage device 6.

Figure 5:
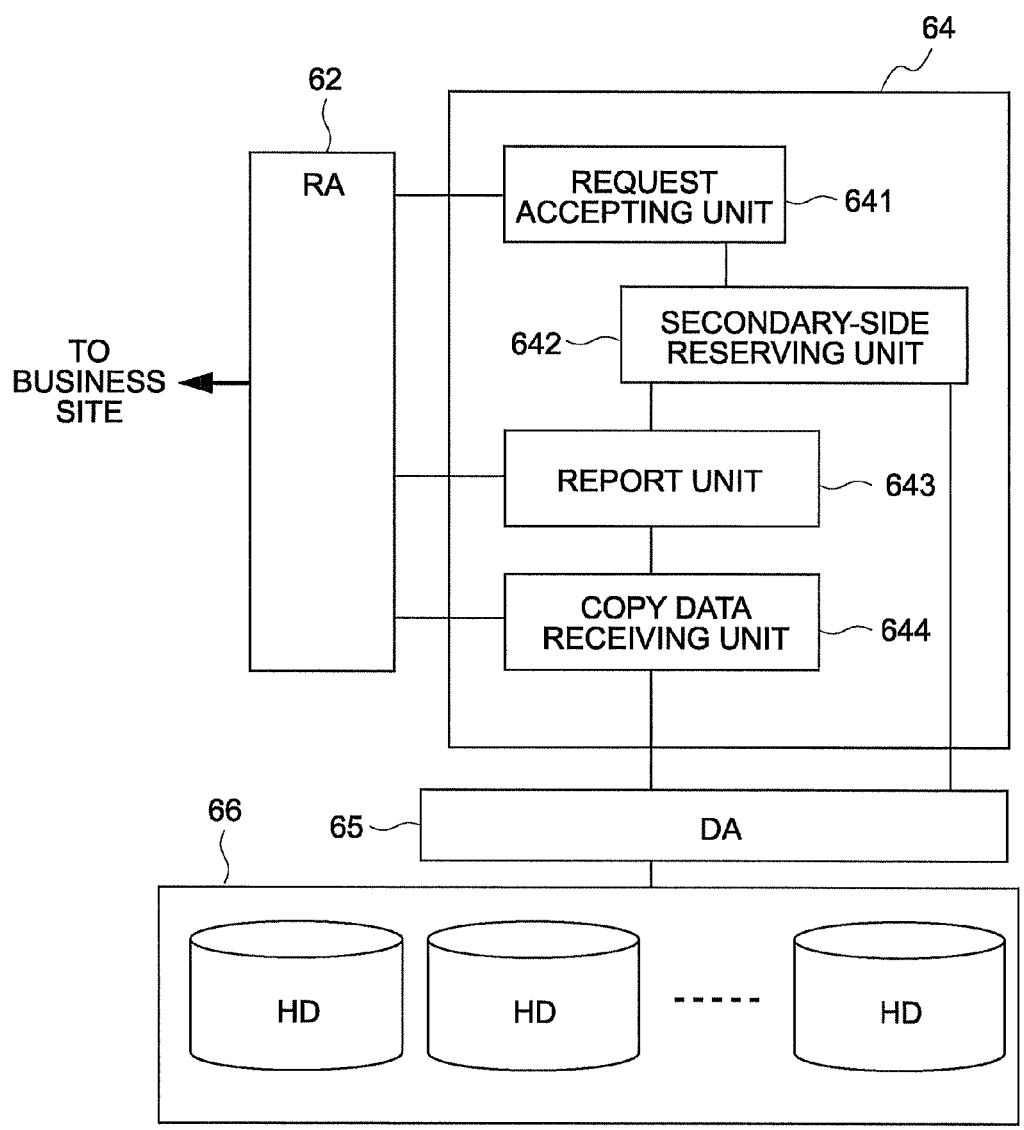
FIG. 5 is a function block diagram of a second storage device.

FIG. 5 is a functional block diagram of the second storage device 6. The CPU of the centralized control module 64 executes the control program developed on the memory, and realizes the respective functions illustrated in FIG. 5. As illustrated in FIG. 5, the second storage device 6 includes a request accepting unit 641, a secondary-side reserving unit 642, a report unit 643 and a copy data receiving unit 644.

The request accepting unit 641 accepts, from the first storage device 5, a request for reserving the logical volume of the second storage device 6 as the secondary-side storage area, which becomes the copy destination in the copy process.

The secondary-side reserving unit 642 reserves the logical volume as the secondary-side storage area in the storage area including one or plural external storage devices 66 in response to the request of the first storage devices. The report unit 643 reports the logical volume number for identifying the reserved logical volume to the first storage device.

The copy data receiving unit 644 receives, from the first storage device 5, the data added or updated to or in the copy process target logical volume, and stores this data in the logical volume as the secondary-side storage area.

FIG. 6 illustrates allocation information managed by the first storage device 5. The allocation information is information through which to associate the copy target logical volume in the first storage device 5 with the copy destination logical volume number in the second storage device 6. The centralized control module 54 manages and updates the allocation information, and refers to the allocation information when in the copy process.

As in FIG. 6, the allocation information is organized in a table format including a plurality of rows. Each row is called a record. Each row of the allocation information contains a copy source area identifier, a copy destination device identifier, a copy destination area identifier and an allocation quantity.

Among these data, the copy source area identifier is, e.g., the formation for identifying the copy process target logical volume of the first storage device 5. The copy source area identifier is, e.g., the logical volume number in the first storage device 5. The copy destination device identifier is the information for identifying the second storage device 6. The copy destination device identifier is, if there is a plurality of copy destination devices, used for identifying the copy destination device. Accordingly, for instance, as in the configuration of FIG. 2, if the copy destination of the first storage device 5 is limited to the second storage device 6, the copy destination device identifier may not be contained in the allocation information.

The copy destination area identifier is the information for identifying the logical volume of the second storage device 6, which becomes the copy destination in the copy process. The copy destination area identifier is, e.g., the logical volume number in the second storage device 6. The allocation quantity is a storage capacity of each of the copy source logical volume and the copy destination logical volume and is designated by, e.g., a giga byte unit, a byte unit or an extent count, a block count, etc.

Key points of the configuration and the process of the information system 1 in the first embodiment discussed above are given as follows. When starting up the copy process, the first storage device 5 notifies the second storage device 6 of the capacity information containing the storage capacity of the logical volume. The first storage device 5 as the copy source device manages the capacity information of the copy source logical volume. Further, the first storage device 5 as the copy source device recognizes the second storage device 6 as the copy destination device. The notification of the capacity information is given via the path used for the copy process.

Then, the second storage device 6 receiving the notification at the backup site creates the copy destination logical volume according to the capacity information from not-yet-allocated areas. The second storage device 6 reports the logical volume number of the allocated logical volume as the copy destination area identifier to the first storage device 5.

Hereafter, the first storage device 5 designates the logical volume number reported from the second storage device 6, and executes the copy process, i.e., the data synchronizing process.

As discussed above, according to the information system 1 in the embodiment, when starting up the copy process, the capacity information of the copy source logical volume is transmitted to the second storage device 6 at the backup site. The second storage device 6 allocates, based on this capacity information, the copy destination logical volume. The user may not perform the same operations at the backup site, corresponding to the new addition of the logical volume and the additional allocation of the existing logical volume at the business site of the copy source device. Accordingly, the necessity for the maintenance PC that is used for allocating the logical volume of the second storage device 6 is eliminated at the backup site. Moreover, when starting up the copy process, the copy destination logical volume is created, and hence the user may not manage the individual copy destination logical volume. The user may simply recognize and manage a physical total capacity, i.e., the total capacity of the external storage device 66. The copy process is therefore actualized in an extremely simple procedure.

From what has been discussed so far, the backup site becomes the site with no server. Namely, at the backup site, the server and the maintenance PC are omitted. The user may simply install the second storage device 6 at the backup site.

The copy destination logical volume is allocated through the communications between the first storage device 5 as the copy source device and the second storage device 6 according to the capacity information transmitted from the copy source device. Moreover, the information on the logical volume created by the second storage device 6 at the backup site is reported through the communications to the business site of the copy source device and further reported to the business server 2 or the backup server 3. Accordingly, the structure of the logical volume at the backup site can be managed at the business site. As a result, even when the plurality of storage devices exists at the backup site, the selection of the copy destination storage device is facilitated at the business site. The management at the backup site described above does not involve using the control LAN and the maintenance PC but is realized by use of the path 7 for remote copy.

Note that the first storage device 5 at the business site includes the plurality of external storage devices 56 and creates the logical volume. Moreover, the second storage device 6 at the backup site includes the plurality of external storage devices 66 and creates the logical volume. The processes described above are not, however, limited to the configuration such as this. For example, the first storage device 5 includes one piece of physical external storage device 56, and the second storage device 6 includes one piece of physical external storage device 66, in which case also the processes described above can be carried out.

Second Embodiment

The information system 1 according to a second embodiment will be described with reference to FIG. 7. In the second embodiment, multi-stage copy is executed. Other configurations and operations in the second embodiment are the same as those in the first embodiment. Such being the case, the same components as those in the first embodiment are marked with the same numerals and symbols, and their explanations are omitted. Moreover, the specific configurations of the storage devices according to the second embodiment are illustrated in, e.g., FIG. 3.

The multi-stage copy can be exemplified as a process of preparing a plurality of copy destination logical volumes and copying the copy source data to the plurality of logical volumes separately at a plurality of stages in the copy destination device. An application of conducting the multi-stage copy is exemplified by a case of separately using the stages depending on whether, e.g., a transaction in an online transaction process is committed or not.

For instance, a first logical volume is used as a buffer area of the logical volume at the business site. Therefore, the data is transferred to the first logical volume as the copy destination volume each time the data is updated in the copy source volume. Then, in the case of indicating the commitment at the business site, the data of the first logical volume is copied and written to a second logical volume as the copy destination volume. Accordingly, it follows that the latest data at the point of time when committed at the business site is guaranteed in the second logical volume as the copy destination volume. Note that a second example of the multi-stage copy is exemplified by a case of simply preparing the plurality of copy destination logical volumes in redundancy irrespective of committing the transaction.

Figure 7:
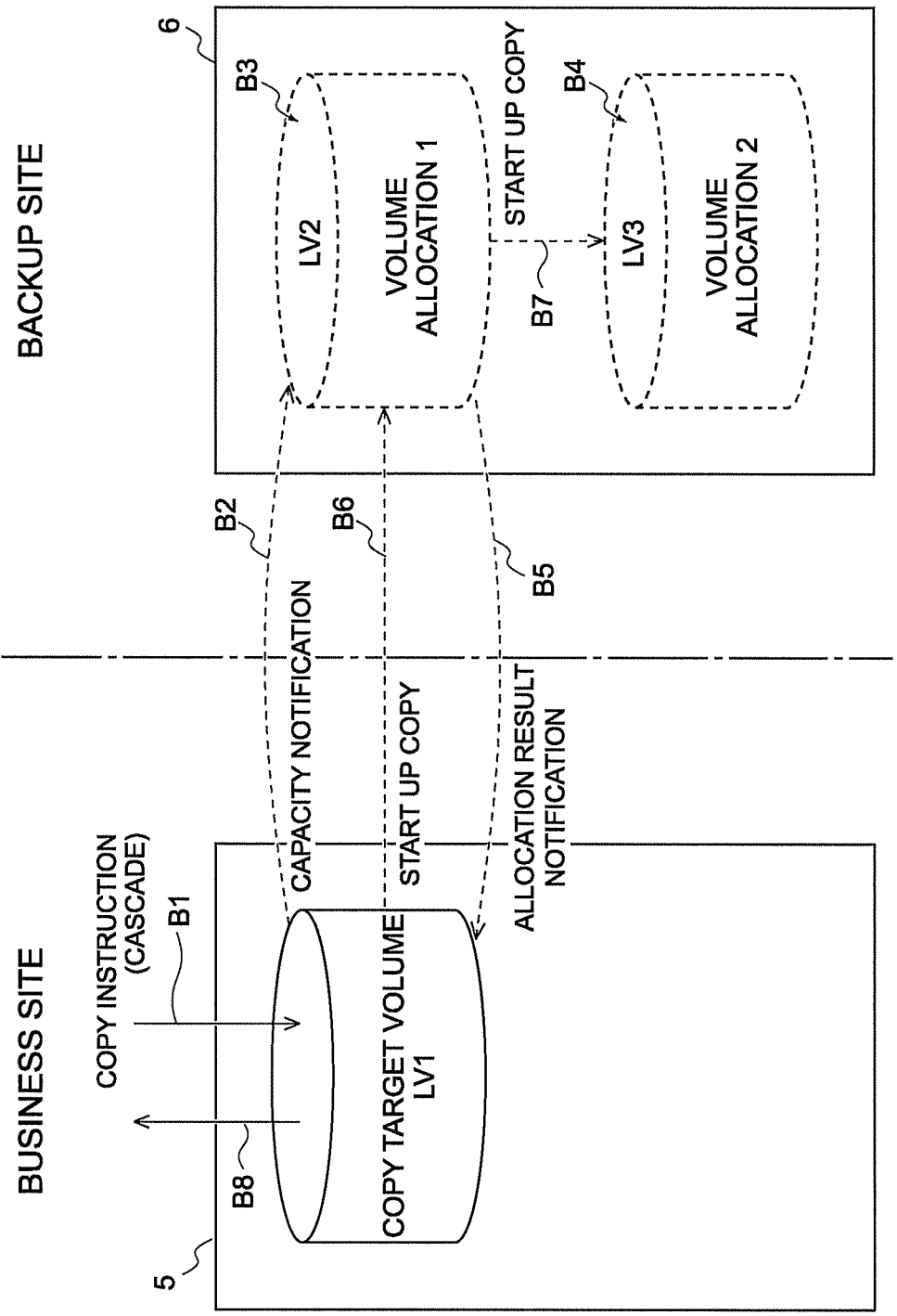
FIG. 7 is a diagram illustrating a multi-stage copy process.

FIG. 7 illustrates the multi-stage copy process. The multi-stage copy is called cascade copy. In the same way as in the first embodiment, e.g., the CPU of the centralized control module 54 depicted in FIG. 3 executes the control program, thereby enabling the following process to be realized. In this example, the computer, e.g., the business server 2 or the backup server 3 illustrated in FIG. 2 at the business site instructs the first storage device 5 to start up the multi-stage copy process on the logical volume basis (an arrow B1). At this time, the computer at the business site designates the multi-stage copy process target logical volume of the first storage device 5 and the second storage device 6 as the copy destination device. It is now assumed that LV1 represents the copy target logical volume.

Then, the first storage device 5 acquires the capacity information containing the storage capacity of the designated logical volume LV1 and transmits this capacity information to the second storage device 6 (an arrow E2). This transmission serves as a multi-stage copy area reserving instruction given to the second storage device 6 from the first storage device 5. Accordingly, this transmission may contain information corresponding to the multi-stage copy area reserving instruction.

Then, the second storage device 6 at the backup site allocates a new logical volume on the external storage device 66 of the second storage device 6 by employing the capacity information received from the first storage device (an arrow B3). Now, an assumption is that LVN2 represents the logical volume number of the newly reserved logical volume.

When succeeding in the allocation of the logical volume LV2, the second storage device 6 further allocates a multi-stage copy destination logical volume LV3 (an arrow B4). It is now assumed that LVN3 denotes the logical volume number of the logical volume LV3 that is newly reserved as the multi-stage copy destination volume.

When succeeding in the allocation of the logical volumes LV2, LV3, the second storage device 6 transmits the logical volume number LVN2 of the logical volume LV2 to the first storage device 5 (an arrow B5). This transmission can be said to be a response showing completion of the preparation for performing the multi-stage copy.

When acquiring the logical volume number of the logical volume LV2 in the second storage device 6, the first storage device 5 is stored with the copy destination logical volume number LVN2 in the way of being associated with the copy source logical volume number LVN1. Furthermore, the first storage device 5 designates the copy destination logical volume number LVN2 in the second storage device 6, and starts up the multi-stage copy process in a way that targets on the copy source logical volume LV1. The multi-stage copy process is a process of storing the data of the designated logical volume within the first storage device 5 in the plurality of logical volumes LV2, LV3 of the second storage device.

With this copy process, the first storage device 5 at first transfers the existing data retained in the copy source logical volume LV1 to the second storage device 6 (an arrow 86). The second storage device 6 stores the transferred data in the logical volume LV2. Further, the second storage device 6 stores the transferred data in the multi-stage copy destination logical volume LV3.

Then, the first storage device 5, as a result of starting up the copy process, reports the copy destination logical volume number LVN2 to the computer at the business site, which has given the copy process startup instruction (an arrow B8).

Hereafter, each time the data is updated or added in the logical volume LV1 of the first storage device 5, it follows that the updated or added data is stored in the logical volume LV2 specified by the logical volume number LVN2 in the second storage device 6.

Moreover, if the multi-stage copy is carried out concomitantly with the commitment, the commitment instruction given to the first storage device 5 at the business site is transmitted also to the second storage device 6 at the backup site. The second storage device 6, upon receiving the commitment instruction, reflects the updated data of the logical volume LV2 also in the logical volume LV3. Then, the second storage device 6, when completing the multi-stage copy, reports the completion of the multi-stage copy to the first storage device.

If the multi-stage copy is realized as the data storage in the plurality of logical volumes at the backup site, however, the transmitted data may be stored in the plurality of logical volumes LV2, LV3 each time the data at the data update time in the first storage device 5 is transmitted to the second storage device 6, it is sufficient that the transmitted data is stored in the plurality of logical volumes LV2, LV3.

As described above, even in such a case that the copy destination device executes the multi-stage copy, in the same way as in the first embodiment, when starting up the copy process, the process of reserving the logical volume is realized in the second storage device 6 as the copy destination device. Accordingly, the user may omit the server and the maintenance PC at the backup site of the copy destination device. Furthermore, the user has no necessity for a time-consuming operation of managing the logical volume in the copy destination device.

Third Embodiment

The information system 1 according to a third embodiment will be described with reference to FIG. 8. The third embodiment will exemplify a finishing process of finishing the copy process and releasing the area at the backup site. Other configurations and operations of the third embodiment are the same as those in the first and second embodiments. This being the case, the same components as those in the first embodiment or the second embodiment are marked with the same numerals and symbols, and their explanations are omitted. Further, a specific configuration of the storage device according to the third embodiment is illustrated in, e.g., FIG. 3.

Figure 8:
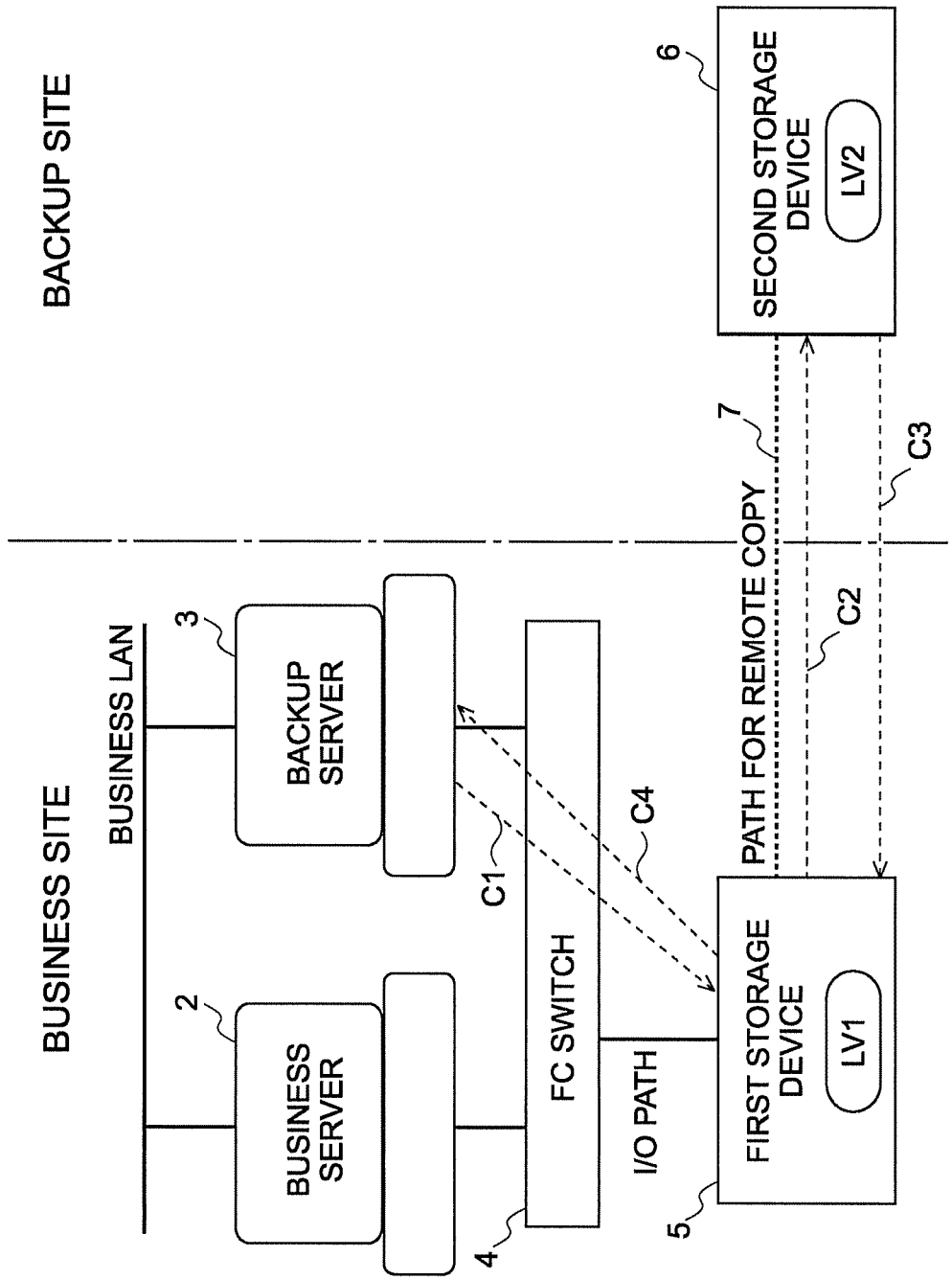
FIG. 8 is a diagram illustrating a procedure of a finishing process.

FIG. 8 illustrates a procedure of the finishing process. For example, the CPU of the centralized control module 54 illustrated in FIG. 3 executes the control program, thereby enabling the following process to be realized in the same way as in the first embodiment. In this process, to start with, the backup server 3 at the business site instructs the first storage device 5 at the business site to stop the copy process of the business data (an arrow C1). This instruction may be made according to, e.g., a user's input to a user interface of the terminal connected to the backup server 3. This instruction is inputted to the first storage device 5 via the signal path such as the FC.

The first storage device 5 transmits the stop of the copy process to the second storage device 6 at the backup site (an arrow C2). Then, the second storage device 6 at the backup site executes the stop process of the copy process. At this time, the second storage device 6 releases the copy destination logical volume LV2. The released logical volume LV2 becomes a free area. Moreover, for example, as in the second embodiment, in the case of executing the multi-stage copy, the second storage device 6 releases also other logical volumes such as the multi-stage copy destination volume, i.e., the logical volume LV3. The storage device 6, upon completion of the release, reports the termination to the storage device 5 (an arrow C3). The storage device 5, when receiving the report from the storage device 6, notifies the server giving the copy instruction that the finishing process is completed (an arrow C4).

As described above, the information system 1 in the third embodiment, in the case of finishing the copy process, releases the copy destination logical volumes LV2, LV3 according to the instruction given from the business site. Accordingly, in the information system 1, the user may not install the maintenance PC at the backup site. The user may not individually manage the logical volume at the backup site.

Fourth Embodiment

An information system 101 according to a fourth embodiment will be described with reference to FIGS. 9 through 18. The fourth embodiment will exemplify the information system 101 provided with the plurality of storage devices at the business site and the backup site, respectively. Other configurations and operations in the fourth embodiment are the same as those in the first through third embodiments. Such being the case, the same components as those in the first through third embodiments are marked with the same numerals and symbols, and their explanations are omitted. Moreover, the specific configuration of the storage device according to the fourth embodiment is exemplifies by, e.g., the storage device 5 FIG. 3.

Figure 9:
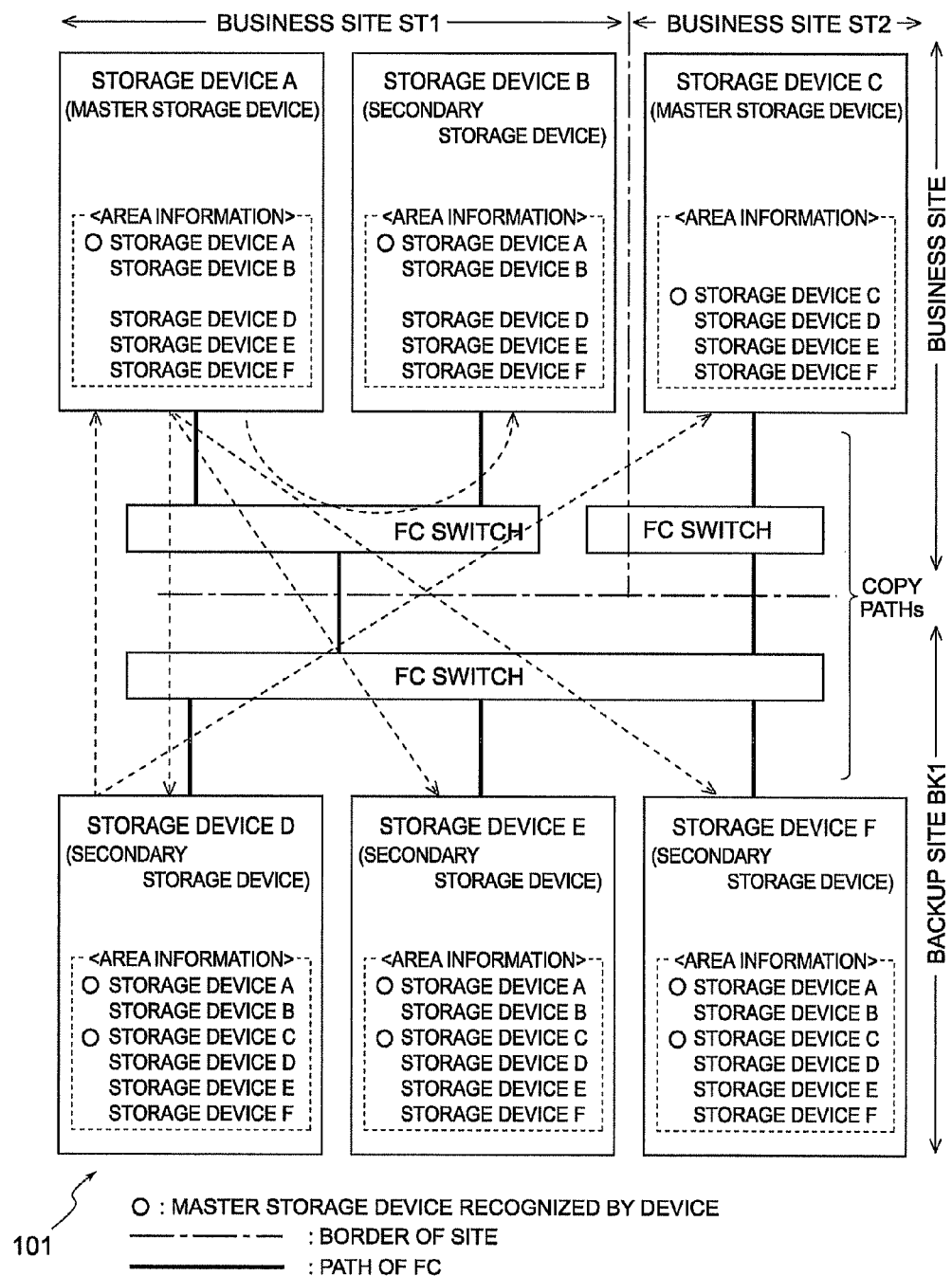
FIG. 9 is a diagram illustrating a configuration of the information system in a fourth embodiment.

FIG. 9 illustrates a configuration of the information system 101 in the fourth embodiment. The information system 101 includes business sites ST1, ST2 and a backup site BK1. The business site ST1 embraces a storage device A and a storage device B. Further, the business site ST2 embraces a storage device C. Incidentally, though omitted in FIG. 9, the computers like the business server 2 are installed at the business sites ST1 and ST2. Further, the backup site BK1 embraces storage devices D, E and F. The storage devices described above are connected to each other via the signal paths such as the FCs. Moreover, the signal paths such as the FCs are connected by a plurality of FC switches. These signal paths such as the FCs are used for the copy process of copying the data in the business sites ST1, ST2 to the backup site BK1. These signal paths such as the FCs are called copy paths.

Among these storage devices, the storage device A and the storage device C are classified into master storage devices. The master storage device distributes housing information on the self-device and the storage devices managed by the self-device to other storage devices. The housing information contains, with respect to each storage device, a free area, a device type and information on the site where the storage device is installed. The storage device to which the master storage device distributes the housing information is called a secondary storage device.

In FIG. 9, the storage device B at the business site ST1 and the storage devices D, E, F at the backup site BK1 are the secondary storage devices. In the example of FIG. 9, the business site ST2 does not include the secondary storage device. Further, in the example of FIG. 9, the backup site BK1 includes none of the master storage device.

FIGS. 10 through 12 illustrate the housing information. An example in FIG. 10 is that the housing information is described in a table format organized by a plurality of rows (records). Each row of the housing information is called the record. Each record corresponds to one storage device. Each row of the housing information contains respective items (fields) such as a device identifier, a free capacity, a device type and site information.

Herein, the device identifier is information for identifying the storage device. The free capacity is a free capacity of the storage device, i.e., a size of the writable area. The device type is information for specifying which type of device, the master storage device or the secondary storage device, the storage device is classified as. The site information is information for specifying which site, the business site or the backup site, the site where the storage device is installed is classified as.

An example in FIG. 10 is that the housing information held by the storage device A contains information of the storage device A itself, and information of the secondary storage devices B, D, E, F subordinate to the storage device A. The business site ST1, at which the storage device A is installed, is different from the business site ST2 where the storage device C is installed. The housing information held by the storage device A does not therefore contain the information of the storage device C.

FIG. 11 illustrates the housing information held by the storage device C. A structure of each row of the housing information is the same as in the case of FIG. 10. As in FIG. 11, the housing information held by the storage device C contains the information of the storage device C itself, and the information of the secondary storage devices D, E, F subordinate to the storage device C. The housing information held by the storage device C does not, however, contain the information of the storage devices A, B installed at the business site ST1. This is because an inter-site copy process is not executed between the business sites ST1 and ST2, and hence the housing information held by the storage device C at the business site ST2 may not contain the information of the business site ST1.

FIG. 12 illustrates the housing information held by the storage device D. As in FIG. 12, the housing information of the storage device D contains the information of the storage devices A, B installed at the business site ST1, the information of the storage device C installed at the business site ST2 and the information of the storage devices D, E, F installed at the backup site BK1. It is because the inter-site copy process is executed at the backup site BK1 where the storage device D is installed.

In the fourth embodiment, each storage device has the allocation information in addition to the housing information. The allocation information contains the information on the copy destination volume allocated for the copy process and the information on a relation between the copy source and the copy destination. Herein, the terminologies of the elements (items) contained in the allocation information are defined. To start with, a copy source device identifier is information for identifying the device having the copy source data when executing the copy process. Further, a copy source area identifier is information for identifying the volume on the device having the copy source data when executing the copy process.

Moreover, a copy destination device identifier is information for identifying the copy destination device to which the data is copied when executing the copy process. Further, a copy destination area identifier is information for identifying the volume on the copy destination device to which the data is copied when executing the copy process. Note that each storage device retains the record of the allocation information in the way of being associated with the copy process started up. The relation between the copy source and the copy destination in the started-up copy process is called a session. Furthermore, the number of started-up copy processes is also called a session count.

FIGS. 13 through 15 illustrate examples of the allocation information. FIG. 13 illustrates the example of the allocation information held by the storage device A. In the example of FIG. 13, the allocation information is described in the table format organized by the plurality of rows (records). Each row of the allocation information is called the record. As in FIG. 13, each row of the allocation information contains a copy source device identifier, a copy source area identifier, a copy destination device identifier, a copy destination area identifier and an allocation capacity. Herein, the allocation capacity is a storage capacity of each logical volume.

As described above, each row of the allocation information corresponds to one session of the copy process. Namely, each row defines an associative relation between the copy source and the copy destination. Accordingly, the allocation information of the storage device A contains the session of the copy process to which the storage device A is related. In the example of FIG. 13, five area identifiers of the copy source storage device A are associated with five area identifiers of the copy destination device. Further, in FIG. 13, three area identifiers of the storage device D and two area identifiers of the storage device E are designated as the copy destinations. On the other hand, according to the allocation information in FIG. 13, the session of the copy process to the storage device F is not set in the storage device A.

FIG. 14 illustrates the example of the allocation information held by the storage device C. The allocation information of the storage device C contains the session of the copy process to which the storage device C is related. In the example of FIG. 14, the two area identifiers of the copy source storage device C are associated with the two area identifiers of the copy destination storage device D. Further, the three area identifiers of the copy source storage device C are associated with the three area identifiers of the copy destination storage device F. On the other hand, according to the allocation information in FIG. 14, the session of the copy process to the storage device E is not set in the storage device C.

FIG. 15 illustrates the example of the allocation information held by the storage device D. According to the allocation information in FIG. 15, the session of the copy process between the storage devices A and C is set in the storage device D.

Figure 16:
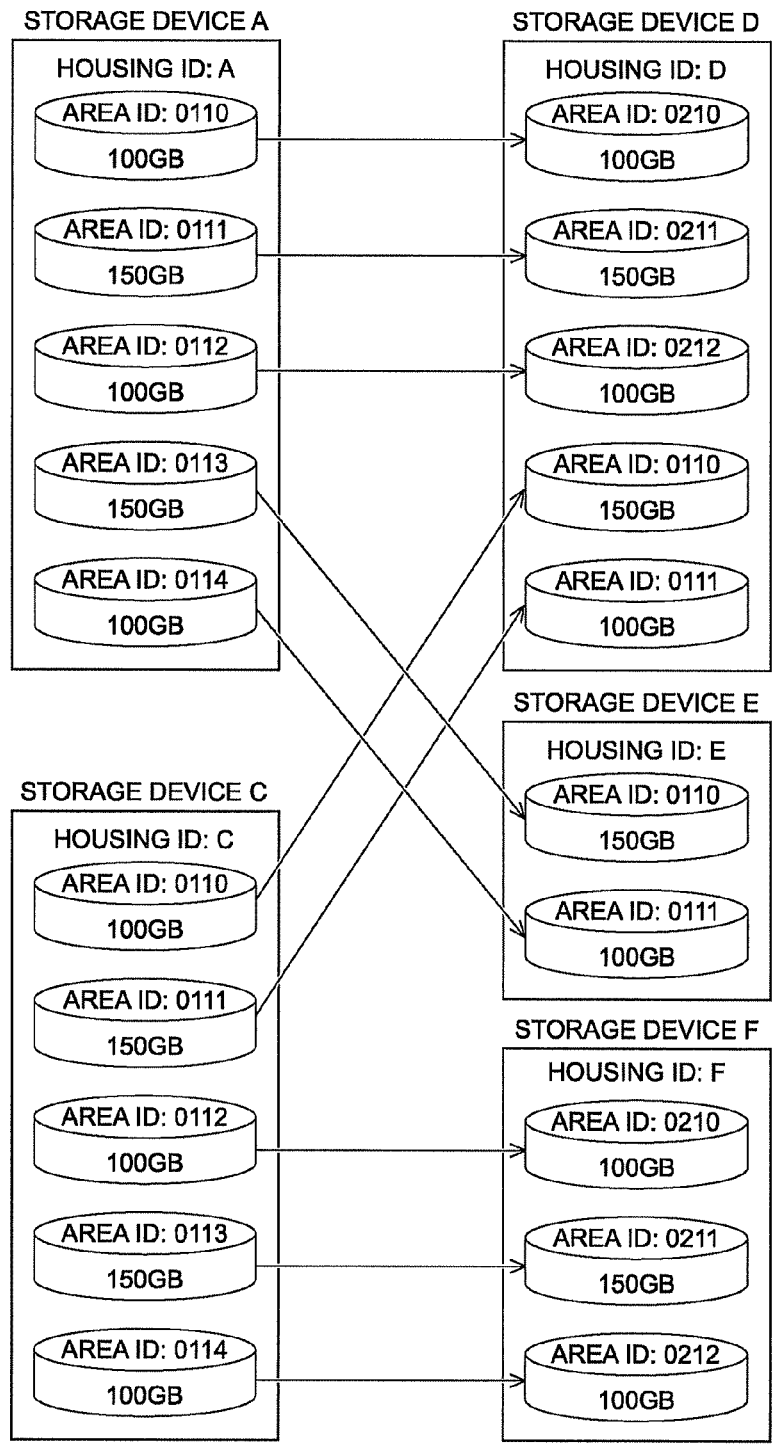
FIG. 16 is a diagram illustrating a session status of a copy process.

FIG. 16 is a diagram illustrating a session status of the copy process in each of FIGS. 13, 14 and 15. For example, the copy sessions for executing the copy process to the logical volumes specified by the area identifiers 0210, 0211 and 0212 of the storage device D are set individually in the logical volumes specified by the area identifiers 0110, 0111 and 0112 of the storage device A. Further, the copy sessions for executing the copy process to the logical volumes specified by the area identifiers 0110 and 0111 of the storage device E are set respectively in the logical volumes specified by the area identifiers 0113 and 0114 of the storage device A.

On the other hand, the copy sessions for executing the copy process to the logical volumes specified by the area identifiers 0110 and 0111 of the storage device D are set respectively in the logical volumes specified by the area identifiers 0110 and 0111 of the storage device A. Further, the copy sessions for executing the copy process to the logical volumes specified by the area identifiers 0210, 0211 and 0212 of the storage device F are set respectively in the logical volumes specified by the area identifiers 0112, 0113 and 0114 of the storage device C.

Figure 17:
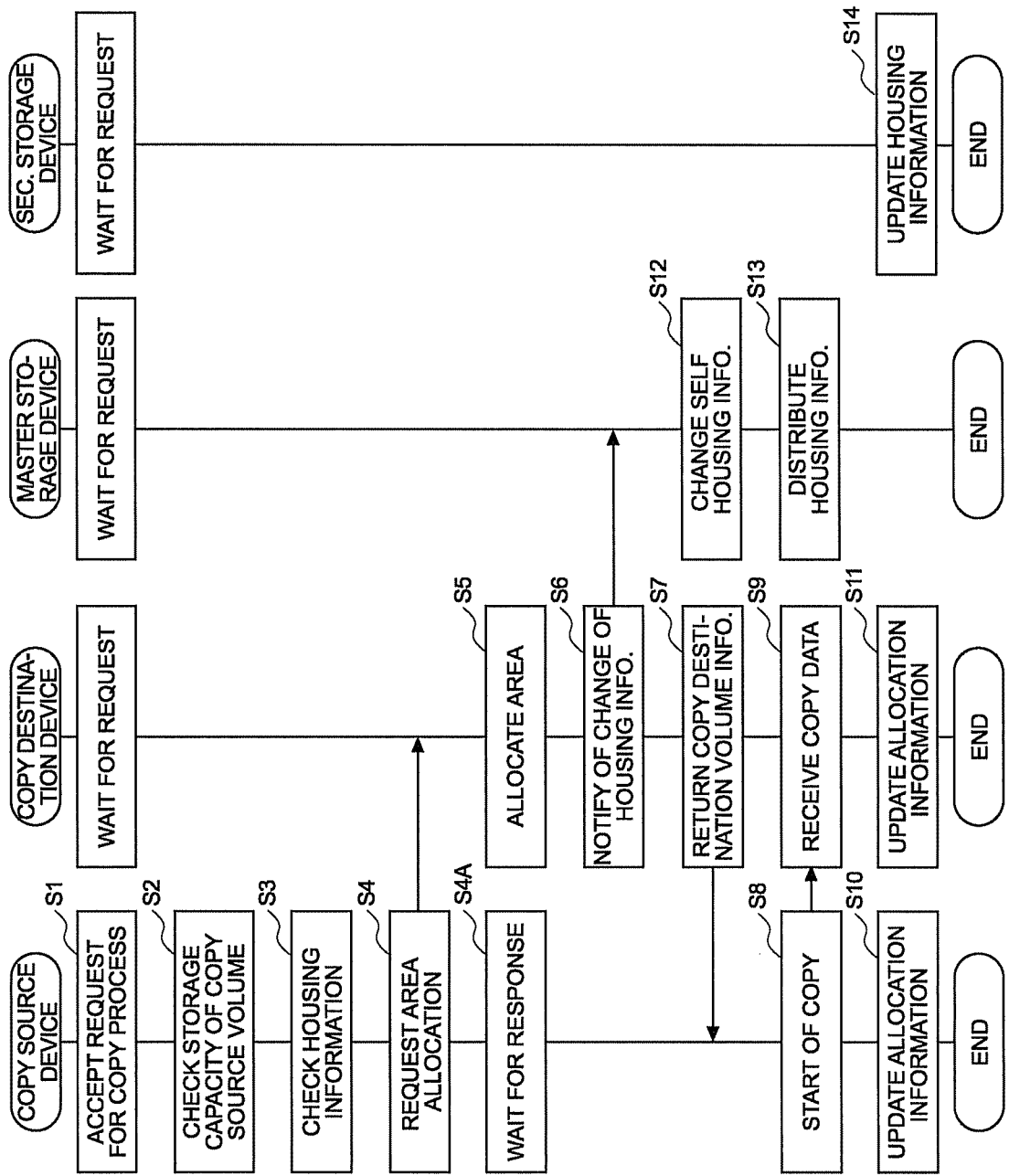
FIG. 17 is a diagram illustrating a processing flow when starting up the copy process.

FIG. 17 illustrates a processing flow when starting up the copy process. The processing flow in FIG. 17 includes processing sequences of the copy source device, the copy destination device, the master storage device and the secondary storage device. The CPU of the centralized control module 54 depicted in FIG. 3 executes, in the same way as in the first embodiment, the control program, thereby enabling the following processes to be realized. Herein, the copy source device is the copy source storage device that retains the copy target data in the copy process. The copy source device is, e.g., the storage device A or the storage device B at the business site ST1 illustrated in FIG. 9.

Moreover, the copy destination device is the copy destination storage device to which the data is transferred in the copy process. The copy destination device is exemplified by the storage devices D, E, F at the backup site BK1 illustrated in FIG. 9.

Further, the master storage device is the storage device which distributes the housing information to other secondary storage devices. The master storage device is exemplified by the storage device A at the business site ST1 illustrated in FIG. 9 or the storage device C at the business site ST2 illustrated therein.

Note that in the case of the business site ST2 illustrated in FIG. 9, the master storage device C exists, while the secondary storage device does not exist. Accordingly, in the flow of FIG. 17, the copy source storage device is the same as the master storage device in the case of the business site ST2.

In this process, to begin with, the copy source device accepts a request for the copy process. For example, though omitted in FIG. 9, the business computer such as the business server 2 or the backup server 3 in FIG. 2 is installed at the business site. The user of the information system 101 requests, from on, e.g., the user's terminal, the business computer to execute the copy process. More specifically, the user of the information system 101 inputs the device identifier of the copy process target storage device and the area identifier for identifying the copy process target logical volume within this storage device. In this case, any inconvenience may not be caused by using the logical volume recognized by the user, which is conceptualized as the partition or the drive recognized via OS (Operating System) etc of the business computer. The business computer may simply convert the designated partition or drive into the logical volume and indicate the logical volume to the storage device.

Then, the business computer requests the designated storage device for the copy process together with the designation of the copy process target logical volume according to the input given from the user. At this time, the requested storage device functions as the copy source device. Then, the copy source device accepts the request for the copy process (S1). Accordingly, the copy source device in this case may be either the master storage device or the secondary storage device at the business sites ST1, ST2.

Next, the copy source device checks the storage capacity of the copy source volume designated by the user (S2). Each storage device manages the storage capacity of each logical volume within the self-device. For instance, the storage capacity is recorded in a management table structured on a per-logical-volume basis. Therefore, the copy source device may simply read the storage capacity from the management table with respect to the designated logical volume.

Subsequently, the copy source device checks the housing information that recognized by the self-device (S3). The housing information contains, as illustrated in FIG. 10, the information of the storage device existing at the backup site BK1 and enabled to be designated as the copy destination device. Such being the case, the copy source device selects, based on the housing information retained by the self-device, the storage device existing at the backup site BK1 and having a free area equal to or larger than the storage capacity of the copy source volume.

Next, the copy source device requests the storage device selected in S3 for area allocation (S4). The request for this area allocation is transmitted via the signal path such as the FC or the path 7 for remote copy. The request for the area allocation includes the storage capacity to be allocated. Thereafter, the copy source device comes to a status of waiting for a response from the copy destination device (S4A).

Then, the copy destination device requested to make the area allocation allocates the copy destination area from the free area of the self-device (S5). To be more specific, the copy destination device creates the logical volume serving as the copy destination volume with the designated storage capacity.

Next, the copy destination device performing the area allocation reduces the capacity with the area allocation being conducted from the free capacity of the self-device, and updates the housing information of the self-device. Then, the copy destination device notifies the master storage device of the free capacity of the self-device after being updated (S6). At this time, the copy destination device notifies the master storage device of the device identifier and the free capacity of the self-device.

Subsequently, the copy destination device performing the area allocation notifies the copy source device of the device identifier and the area identifier of the area allocated as the copy destination volume (S7).

With the operations described above, the copy source device starts up the copy process by use of the device identifier and the area identifier received from the copy destination device (S8). The copy process is the same as the process explained in the first embodiment through the third embodiment. In the copy process, the copy destination device receives the copy data when the copy source device starts up the copy process (S9). The copy destination device stores the copy data received in the copy process in the copy destination volume specified by the designated area identifier.

Moreover, the copy source device updates the allocation information retained within the self-device (S10). Namely, the copy source device adds, to the allocation information, the device identifier of the copy source device, the area identifier of the copy source volume, the device identifier of the copy destination device, the area identifier of the copy destination volume and the allocation quantity in the copy process started up in the process of S8.

Furthermore, the copy destination device updates the allocation information retained within the self-device (S11). Namely, the copy destination device adds, to the allocation information, the device identifier of the copy source device, the area identifier of the copy source volume, the device identifier of the copy destination device, the area identifier of the copy destination volume and the allocation quantity in the copy process started up in the process of S8.

On the other hand, the master storage device, which receives the free capacity after being updated with respect to the housing information in the process of S6, updates, based on the device identifier of the copy destination device with the housing information being updated, the housing information with the free capacity of the copy destination device (S12). Moreover, the master storage device distributes the device identifier of the copy destination device with the housing information being updated and the free capacity after being updated to the second storage device recognized by the self-device (S13).

The secondary storage device updates the housing information with the device identifier and the free capacity received from the master storage device (S14).

An assumption in FIG. 17 is that the copy source device accepting the request for the copy process and the master storage device are different storage devices. In the copy process of the information system 101, however, the copy source device and the master storage device may be the same device.

FIG. 18 illustrates the processing follow when finishing the copy process. In FIG. 18, after starting up the copy process, each storage device waits for the process to be accepted till the process request occurs.

In this process, at first, the copy source device accepts a request for finishing the copy (S21). The user of the information system 101 requests the business computer to finish the copy process started up in the procedure in FIG. 17 from on, e.g., the user's terminal. More specifically, the user of the information system 101 inputs the device identifier of the copy process target storage device and the area identifier for identifying the copy process target logical volume within the storage device. In this case, the logical volume recognized by the user is recognized via the business computer and the OS, and any inconvenience may not be caused by using the logical volume conceptualized as the partition or the drive. The business computer may simply convert the designated partition or drive into the logical volume and indicate the logical volume to the storage device. When the user's terminal accesses the master storage device or any one of the secondary storage devices, the accessed device may provide the terminal with the allocation information. The terminal may display a list of the area identifiers for specifying the copy process target logical volumes at the business site from the provided allocation information. In this case, the logical volume itself may not be displayed. For instance, the logical volume may be displayed in the way of being converted into a partition name or a drive name from which the logical volume is recognized by the OS of the business computer. Then, the user may select, from the displayed list, the target logical volume of which the copy process is to be finished.

Next, the copy source device notifies the copy destination device that the copy process is finished (S22). Then, the copy source device executes the copy finishing process (S23). Herein, a specific example of the finishing process in the copy source device is exemplified in S25. Similarly, the copy destination device notified of the finish of the copy executes the copy finishing process (S24). Herein, a specific example of the finishing process in the copy destination device is exemplified in S26-S27.

Namely, the copy source device deletes the copy source device identifier, the copy source area identifier, the copy destination device identifier, the copy destination area identifier and the allocation quantity with respect to the copy finished in the process of S23 from the allocation information managed within the self-device (S25). Similarly, the copy source device deletes the copy source device identifier, the copy source area identifier, the copy destination device identifier, the copy destination area identifier and the allocation quantity with respect to the copy finished in the process of S24 (S26).

Next, the copy destination device releases the area allocated as the copy destination volume (S27). The copy destination device, upon an end of the release, reports this purport to the copy source device. The copy source device, when receiving this report, sends notification to the business computer which has given the copy instruction. Further, the copy destination device, after releasing the area, adds a capacity of the released area to the capacity of the free area in the housing information, thus updating the housing information. Moreover, the copy destination device notifies the master storage device of the capacity of the free area after being updated (S28). This notification is the change notification of the housing information.

The master storage device receives, from the copy destination device, the device identifier and the capacity of the free area of the copy destination device. Then, the master storage device changes the free area of the copy destination device, which the device itself retains, with the received free area (S29). Further, the master storage device distributes the change notification of the housing information based on the device identifier and the capacity of the free area of the copy destination device with the update being done to the secondary storage device recognized by the master storage device itself (S30). The secondary storage device updates the housing information with the device identifier and the free capacity received from the master storage device (S31).

The assumption in FIG. 18 is that the copy source device accepting the copy finishing request and the master storage device are the different storage devices. In the copy process of the information system 101, the copy source device and the master storage device may be the same device.

As described above, the information system 101 in the fourth embodiment includes one or plural storage devices at the business sites ST1, ST2, etc. Further, the information system 101 includes one or plural storage devices at the backup site BK1. Then, in the case of providing the plurality of storage devices at the business sites ST1, ST2, etc., at least one single storage device becomes the master storage device. Further, the storage devices other than the master storage device become the secondary storage devices. Then, the master storage device manages the housing information of the self-device and the housing information of other secondary storage devices, and distributes the housing information to the subordinate secondary storage devices. Herein, the housing information contains the free area information of the storage device, the device type for specifying which type of device, the master storage device or the secondary storage device, the storage device is classified as, and the site where the device is installed.

With this configuration, in the system also where the data at the business sites including the multiplicity of storage devices is backed up at the backup site, the operations such as generating the logical volume are simplified. Namely, the storage device on the side of the business site, at first, refers to the housing information when starting up the copy process in the self-device, and recognizes the storage capacity of the copy process target data. Then, the storage device on the side of the business site can specify the storage device at the backup site, which has the storage capacity capable of copying the copy process target logical volume in the self-device. The management of the housing information such as this undergoes maintenance in the process of the master storage device.

Moreover, according to the information system 101 in the fourth embodiment, the backup site BK1 can embrace the plurality of storage devices and can therefore be flexibly extended. Further, according to the information system 101 in the fourth embodiment, the master storage device is provided at each business site, thereby enabling the information system 101 including the plurality of business sites to be configured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A storage system, comprising:
a master storage device and a secondary storage device in a first group; and
a storage device in a second group;
each of the master storage device and the secondary storage device in the first group including:
a first storage unit capable of reservation of a storage area; and
a first control unit to control the first storage unit,
the first control unit in the master storage device being configured to operate as:
a primary-side reserving unit to reserve a primary-side storage area in the first storage unit;
a request unit to request the storage device in the second group to reserve a secondary-side storage area serving as copy destination area of the primary-side storage area;
a checking unit to receive identifying information of the secondary-side storage area reserved by the storage device in the second group;
a management storage unit to store the identifying information of the secondary-side storage area in the way of being associated with the primary-side storage area; and
a transfer unit to transfer data stored in the primary-side storage area to the secondary-side storage area;
the storage device in the second group including:
a second storage unit capable of reservation of a storage area; and
a second control unit to control the second storage unit,
the second control unit being configured to operate as:
a request accepting unit to accept a request for reserving the secondary-side storage area serving as the copy destination area of the primary-side storage area from the master storage device in the first group;
a secondary-side reserving unit to reserve the secondary-side storage area in the second storage unit in response to the request; and
a report unit to report identifying information of the reserved secondary-side storage area to the master storage device in the first group,
wherein the first control unit of the master storage device in the first group manages information related to free area of the first storage unit in the master storage device and information related to free area of the first storage unit in the secondary storage device, and
the first control unit of the master storage device in the first group operates as a distribution unit to distribute, to the secondary storage device in the first group and to the storage device in the second group, the information related to the free area of the first storage unit in the master storage device and the information related to the free area of the first storage unit in the secondary storage device.

2. The storage system according to claim 1, wherein the identifying information is a logical volume number for recognizing the storage area of the second storage device.

3. The storage system according to claim 1, wherein each of the first control unit of the secondary storage device and the second control unit of the storage device holds the information related to the free area of the first storage unit in the master storage device and the information related to the free area of the first storage unit in the secondary storage device and updates holding information based on the information distributed by the first control unit of the master storage device.

4. An information storing method executed by a storage system
that includes a master storage device and a secondary storage device in a first group; and
a storage device in a second group, each of the master storage device and the secondary storage device in the first group including:
a first storage unit capable of reservation of a storage area; and
a first control unit to control the first storage unit,
the storage device in the second group including:
a second storage unit capable of reservation of a storage area; and
a second control unit to control the second storage unit, the method comprising a first process and a third process executed by the first control unit in the master storage device and a second process executed by the second control unit in the storage device,
the first process including:
reserving a primary-side storage area in the first storage unit;
requesting the storage device in the second group to reserve a secondary-side storage area serving as copy destination area of the primary-side storage area;
receiving identifying information of the secondary-side storage area reserved by the storage device in the second group;
storing the identifying information of the secondary-side storage area in the way of being associated with the primary-side storage area; and
transferring data stored in the primary-side storage area to the secondary-side storage area,
the second process including:
accepting a request for reserving the secondary-side storage area serving as the copy destination area of the primary-side storage area from the master storage device;
reserving the secondary-side storage area in the second storage unit in response to the request; and
reporting identifying information of the reserved secondary-side storage area to the master storage device,
the third process including:
managing information related to free area of the first storage unit in the master storage device and information related to free area of the first storage unit in the secondary storage device; and
distributing, to the secondary storage device in the first group and to the storage device in the second group, the information related to the free area of the first storage unit in the master storage device and the information related to the free area of the first storage unit in the secondary storage device.

* * * * *

UNITED STATES PATENT AND TRADEMARK OFFICE
CERTIFICATE OF CORRECTION

| | | |
|---|---|---|
| PATENT NO. | : 8,843,713 B2 | Page 1 of 1 |
| APPLICATION NO. | : 12/749581 | |
| DATED | : September 23, 2014 | |
| INVENTOR(S) | : Hideyuki Tanaka et al. | |

It is certified that error appears in the above-identified patent and that said Letters Patent is hereby corrected as shown below:

On the Title Page, Item [54] and in the Specification, Column 1, Line 2, (Title), Delete "FUNTION" and insert -- FUNCTION --, therefor.

Signed and Sealed this
Twenty-third Day of December, 2014

Michelle K. Lee
*Deputy Director of the United States Patent and Trademark Office*